Aug. 23, 1932.    R. S. JANE    1,872,741

APPARATUS FOR DRY GENERATION OF ACETYLENE

Filed Oct. 23, 1931

INVENTOR
ROBERT S. JANE.
ATTORNEY

Patented Aug. 23, 1932

1,872,741

UNITED STATES PATENT OFFICE

ROBERT S. JANE, OF SHAWINIGAN FALLS, QUEBEC, CANADA, ASSIGNOR TO SHAWINIGAN CHEMICALS LIMITED, OF MONTREAL, QUEBEC, CANADA

APPARATUS FOR DRY GENERATION OF ACETYLENE

Application filed October 23, 1931, Serial No. 570,679, and in Canada May 16, 1930.

Application for Letters Patent of the Dominion of Canada, Serial Number 364,804, has been filed the 16th May, 1930.

This invention relates to improvements in apparatus for hydrating calcium carbide, and the principal objects of the invention are to enable the production of substantially dry acetylene gas and the complete hydration of the carbide. Various other objects and the advantages of the invention may be ascertained from the following description.

In the ordinary processes of hydrating calcium carbide for production of acetylene gas, by feeding carbide into water, an appreciable percentage of the carbide escapes hydration, in spite of the use of a great excess of water, owing to the adherence of hydrate to the lumps of carbide. The gas produced is substantially saturated with water vapour, necessitating drying.

In greater detail, the invention resides in feeding the carbide into a rotating screen contained in a rotating drum and spraying the carbide within the screen with a calculated amount of water. The tumbling action of the screen removes the hydrate from the surface of the carbide lumps, thus keeping the carbide exposed for hydration by the water. Fine particles of carbide which pass the screen are tumbled in the drum and freed from adherent hydrate, so that they are completely hydrated and serve to absorb water from the hydrate, thus producing a substantially dry pulverulent hydrate, absolutely free from carbide, which may be easily handled and which is in excellent condition for admixture with carbon for the manufacture of further carbide. The water supplied is that necessary for complete hydration of the carbide and that necessary to absorb, by evaporation, sufficient of the heat of reaction to render the process entirely safe. The acetylene gas produced contains very much less water than gas made by ordinary wet processes and, in consequence, since water always contains a certain amount of air in solution, less air than gas produced by ordinary methods.

In the accompanying drawing which illustrates one embodiment of the invention, but to the details of which the invention is not confined, since modifications and substitutions of equivalents may be effected:—

Figure 2:
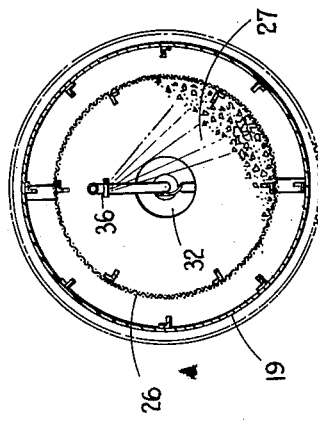
Fig. 2 is a cross sectional view on the line 2—2 of Figure 1.
Figure 1:
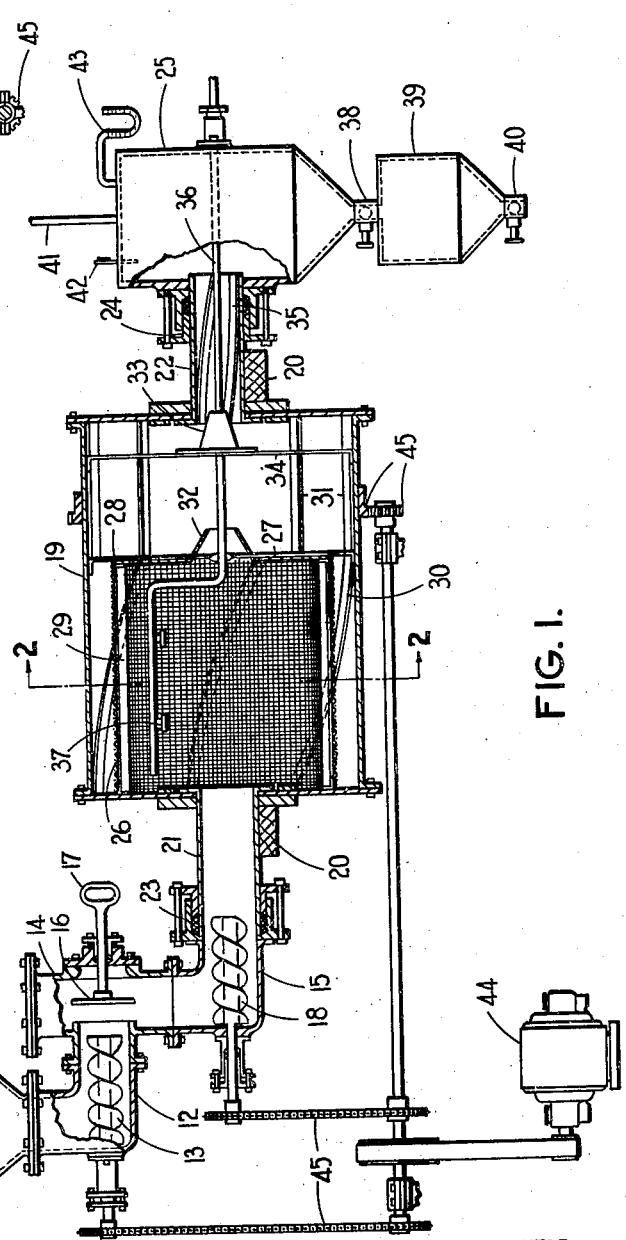
Fig. 1 is a vertical longitudinal sectional view of an acetylene generator.

Referring more particularly to the drawing, 11 designates a closed hopper bottom carbide container mounted upon and discharging by gravity into a primary feed conduit 12 through which carbide is advanced by a feed screw 13. The discharge end of this conduit 12 enters a closed downtake 14 leading to a secondary feed conduit 15 and is provided with a closure plate or valve 16 operable externally of the downtake by any suitable means 17. The carbide is advanced through the secondary conduit by a feed screw 18.

A cylindrical hydrating drum 19 is rotatably mounted in bearings 20 by means of axially disposed hollow trunnions 21 and 22 at its opposite ends, the former of which trunnions is in alignment with the conduit 15 and is connected thereto by stuffing box 23 secured to the conduit. The trunnion 22 passes through a stuffing box 24 into a closed hopper bottom hydrate receiver 25, to which the stuffing box is secured. A cylindrical screen 26 of smaller diameter than the drum is arranged coaxially within the drum and extends from the feeding end of the drum for a suitable distance toward the discharge end, usually somewhat more than half the length of the drum. The inner end of the screen is closed by a centrally apertured plate 27 supported by a spider 28 connected with the inner surface of the drum. The screen is provided internally with ribs 29 which serve to tumble carbide in the screen as it rotates. The mesh of the screen is of such size that it will not become clogged with damp hydrate and at the same time will not pass carbide particles of material size, for example, the mesh may be between one-fifth and one-twentieth of an inch. The screen is preferably of wire in order to have the maximum of screening capacity. The inner surface of the drum between the feeding end and the spider 28 is provided with helical ribs 30 of suitable pitch which serve to work the hydrate toward the discharge end of the drum. Between the spider 28 and the discharge end of the drum, the inner surface thereof is provided with ribs 31 disposed parallel or substantially parallel with the drum axis and adapted to tumble the hydrate and small carbide particles which have passed through the screen for removal of hydrate from the surface of the carbide particles and exposure of the carbide to damp hydrate. The screen end plate carries a frusto-conical shield 32 over its central aperture to prevent hydrate entering into the screen through said aperture. At the discharge end of the drum, a discharge cone 33 is mounted coaxial of the drum by means of a spider 34, the apex of the cone projecting into the discharge trunnion 22. The inner surface of the trunnion 22 is provided with helical ribs 35 which cause the hydrate to move longitudinally through the trunnion and discharge into the receiver 25. A valved water supply pipe 36 passes axially through the discharge trunnion into the screen, being supported by the discharge cone and the spider 28. Within the screen, the pipe extends upwardly and then longitudinally of the screen. This pipe is provided with apertures or nozzles 37 adapted to direct water in fine sprays or jets against the carbide only on the upwardly moving side of the screen at approximately the level where the carbide reaches the limit of its angle of repose and falls from the ribs 29.

The hydrate receiver 25 discharges through a valve 38 into a further closed hopper bottom receptacle 39, which discharges through a valve 40. A gas outlet pipe 41 leads from the top of the receiver 25 which may be provided with a thermometer 42 and manometer 43.

The feed screws and drum are rotated by any suitable means, such as a motor 44 and suitable drive 45 between the motor and the feed screws and drum.

The operation of the device is as follows:—
The valve 16 is closed to exclude air from the drum and the hopper 11 filled with carbide and closed. The valve 16 is then opened and the apparatus set in motion. The screw 13 feeds carbide past the open valve 16 so that it falls into the conduit and trunnion 21 into the rotating screen, wherein it is tumbled and sprayed with water. The water strikes the carbide at the upper limit of its movement so that water not absorbed by the most elevated carbide trickles down over carbide below. The gas escapes through the screen into the drum and flows through the trunnion 22 into the receiver 25. The rotation of the screen and the action of the lifting ribs 29 causes the carbide to be tumbled, so that the hydrate is separated and passes through the screen leaving the carbide exposed for further hydration. The amount of water is regulated to substantially that necessary for complete hydration of the carbide and that necessary to absorb, by evaporation, a substantial part of the heat of reaction. The hydrate passing through the screen contains sufficient water for hydration of the small particles of carbide which also pass through the screen. The damp hydrate and small particles of carbide are fed by the helical ribs 30 toward the discharge end of the drum where they are tumbled until the small particles of carbide are completely hydrated and the hydrate substantially dried by absorption of water therefrom in the hydration of the small carbide particles. Under proper conditions the hydrate passing through the screen will contain about 15% of its weight of moisture and this moisture content will be reduced to about 3% to 5% in the hydration of the small carbide particles. Hydrate containing this small amount of moisture is a dry powder which is easily evacuated from the drum by means of the discharge cone and the helical ribs 35 in the trunnion 22. When sufficient hydrate accumulates in the receiver 25, it is discharged through the valve 38 into the receiver 39 and, after the valve 38 is closed, is discharged through the valve 40. When the water supply is properly adjusted, the temperature of the gas and carbide is held at about 100° C. or a little higher by the cooling resulting from evaporation of a part of the water. This is a safe temperature of operation and the amount of moisture carried out by the gas is much less than in ordinary wet generating processes. The hydration is complete and carbide leaves the generator mixed with the hydrate. The arrangement of valves at the charging and discharging ends of the apparatus excludes air during the charging and discharging. The interlocking of the carbide feed with the rotation of the drum ensures a proper rate of feed so that only the water supply need be adjusted and once this adjustment is obtained the generator requires no attention beyond charging fresh carbide into the receptacle 11 and removing hydrate from the receiver 25.

The amount of water present at any instant is much less than is necessary for complete hydration of the carbide present at the same instant, with the result that the small amount of water contacting the carbide at any instant is immediately and almost entirely taken up in the hydration reaction. Only a small proportion of this water is absorbed by the hydrate, so that the hydrate which forms at the surface of the carbide lumps is for all practical purposes a dry powder which separates easily from the carbide.

Having thus described my invention, what I claim is:—

1. In an acetylene generator, a rotatable cylindrical drum, a cylindrical screen of smaller diameter than the drum fixed within the drum coaxially thereof, means to rotate the drum and screen, means to feed carbide into the screen while it rotates, means operative by rotation of the drum to remove hydrate from the drum while it rotates and means to supply water to the carbide in the screen.

2. In an acetylene generator, a rotatable cylindrical drum, hollow trunnions at the ends of the drum located in axial alignment therewith rotatably supporting the drum, a cylindrical screen of smaller diameter than the drum fixed within the drum coaxially thereof, said screen being spaced at one end from the adjacent end of the drum, means to rotate the drum and screen, means to feed carbide through one of said trunnions into the screen, means to remove hydrate from the drum, at the end thereof spaced from the screen, through the second trunnion, a gas tight receiver for hydrate and gas into which the second trunnion enters, and means to supply water to the carbide in the drum.

3. In an acetylene generator, a rotatable cylindrical drum, a cylindrical screen of smaller diameter than the drum fixed within the drum coaxially thereof, and extending from one end of the drum part way to the other end, means to rotate the drum and screen, means to move material passing through the screen longitudinally of the drum into the space between the end of the drum and the end of the screen, means to tumble material in said space, means to feed carbide into the screen, means to remove hydrate from the drum and means to supply water to the carbide in the screen.

4. In an acetylene generator, a rotatable cylindrical drum, hollow trunnions at the ends of the drum located in axial alignment therewith rotatably supporting the drum, a cylindrical screen of smaller diameter than the drum fixed within the drum coaxially thereof, extending from one end of the drum part way to the other end, means to rotate the drum and screen, helical ribs fixed to the inner surface of the drum outside the screen to move material passing through the screen longitudinally of the drum into the space between the end of the drum and the end of the screen, ribs secured to the inner surface of the drum in said space axially parallel with the drum, a discharge cone arranged in said space coaxially with the drum and having its apex projecting into the adjacent trunnion, helical ribs within said trunnion to move material through the trunnion away from the drum, a gas-tight receiver for hydrate and gas into which the second trunnion enters, and means to supply water to the carbide in the drum.

5. A device according to claim 2, in which the carbide feeding means comprises a conduit in alignment with one of the trunnions, means to move carbide through said conduit and trunnion into the screen, a second conduit discharging into the first conduit, means to move carbide through said second conduit into the first conduit, a valve at the exit end of the second conduit, a closed carbide container arranged to feed carbide into the second conduit, and means for operating both of said carbide moving means to move carbide at the same rate in the two conduits.

6. A device according to claim 1, in which the water supplying means is adapted to direct water in a fine spray on only that portion of the carbide, on the upwardly moving side of the screen, which is at and adjacent the limit of its angle of repose.

7. In an acetylene generator, means to spray lump carbide with water, a screening device to separate hydrate from the surface of the sprayed carbide lumps and to remove the damp hydrate and small particles of carbide from contact with the carbide lumps, means to tumble the damp hydrate and small carbide particles separately from the carbide lumps until the small particles are completely hydrated by the water content of the hydrate and the hydrate thereby dried, means to remove dry hydrate and acetylene gas together from said tumbling means and means connected to the tumbling means, in which the gas is separated from the dry hydrate.

8. In an acetylene generator, a rotatable cylindrical drum, hollow trunnions at the ends of the drum located in axial alignment therewith and rotatably supporting the drum, a cylindrical screen of smaller diameter than the drum fixed in the drum coaxially thereof, said screen being spaced at one end from the adjacent end of the drum, means to rotate the drum and screen, means to feed carbide through one of said trunnions into the screen, means to tumble in the drum material which has passed through the screen and to advance the material into the space between the end of the screen and the adjacent end of the drum, means between the end of the screen and the end of the drum to catch material in process of tumbling and direct it into the adjacent trunnion, and means to advance material through the trunnion away from the drum.

In witness whereof, I have hereunto set my hand.

ROBERT S. JANE.